UNITED STATES PATENT OFFICE.

R. G. WESTACOTT, OF WORCESTER, MASSACHUSETTS, ASSIGNOR TO WESTACOTT, LOMBARD & LOMBARD.

IMPROVEMENT IN THE MANUFACTURE OF CAVIAR.

Specification forming part of Letters Patent No. 7,895, dated January 7, 1851.

*To all whom it may concern:*

Be it known that I, ROBERT GARNAUT WESTACOTT, residing at Worcester, in the county of Worcester and State of Massachusetts, have invented a new and useful Improvement in the Manufacture of Caviar; and I do hereby declare that the same is fully described in the following specification.

Caviar prepared from the roe of the sturgeon is an article of food of which large quantities are consumed by the oriental nations of the Mediterranean Sea, such being mostly prepared on and in the vicinity of the Caspian Sea. For a number of years this branch of commerce has been in a great degree monopolized by Russia; but as the sturgeon is a fish very common on the shores of the United States bordering on the Atlantic coast I have been led to the belief that the people in this country could not only prepare the article in question, but in reality a better one, and, owing to the great expenses incurred in the transit of such as is made at or near Astracan, could send it to the Mediterranean market and successfully compete with, if not entirely drive out of it, the Russian article. The experiments I have made have enabled me to produce an improved manufacture of the article in question, which not only enables me to transport it to warm latitudes and there keep it for a great length of time in a perfect state of preservation, and not only at the same time to prevent its induration in a great degree, if not entirely, but to impart to it a flavor that renders it extremely palatable to those who eat it.

The process of making one hundred pounds of the improved caviar is as follows: The spawn or roe being removed from the fish in quantities of about four pounds each, they (the said quantities) are to be squeezed gently by the hand in order to remove the ova from the membranes or skins by which they are covered. Next take from four to six pounds of fine salt and sprinkle a little in a clean tub. Next place a layer of the ova and a layer of salt alternately in the tub until the whole quantity of the ova and the salt has been placed therein. After the same has been suffered to remain in this state about six hours, pour about six quarts of a strong pickle or salt solution over the top of the mixture. After twelve hours have elapsed, another and like quantity of pickle is to be poured on it. In from thirty to fifty hours, according to the state of the weather, the ova will rise or float on the pickle, while certain foreign matters will settle to the bottom of the tub. While in the pickle the ova goes through a kind of fermentation or process which separates it from extraneous matters or impurities. Next the ova should be carefully removed from the pickle and spread about one-half an inch on the skins or linen or cotton sheets, and these exposed to the air from twenty to forty hours, it being turned over on the sheets in the meantime about four or five times a day. When it is sufficiently dry it should be thoroughly incorporated or mixed with about two ounces of black pepper and three pints of oil extracted from the liver or roe of the male sturgeon. It should next be suffered to stand in the mixing-vessel some ten or twelve days, when it will have acquired a state in which it will be ready for being packed in barrels or tight air-vessels, in which it may be transported to the place of its consumption.

I would remark that my process of preparing the roe differs from that heretofore practiced. It has been customary to combine salt with the roe or ova either by mixing salt with the same or by saturating the latter with a strong pickle or brine and removing the superfluous moisture by pressure, such processes not being sufficient to separate from the ova or roe certain impurities or matters which it is very desirable to remove therefrom.

It will be seen that I suffer the ova previously placed in layers of salt to stand in pickle about two days, or until it undergoes a certain process, by which the ova rises to the top of the pickle and separates from extraneous matters which settle to the bottom of the tub or vessel containing the mixture. This separation having taken place, the ova is removed from the pickle, dried to a proper extent, and afterward mixed with oil extracted from the liver or roe of the male sturgeon. It is next suffered to stand some ten or twelve days in the mixing-vessel, when it will have become ready to be packed for transportation and use.

A particular object of mixing with it the oil from the liver of the male sturgeon is to restore to it the sturgeon flavor and oil which the salting process removed, and which is so necessary to its value in the market as well as to its preservation from injury.

What I claim, therefore, as my invention is—

1. The improvement in the process of salting the roe or ova whereby extraneous matters are separated, the same consisting in suffering it to stand in pickle or a strong saline solution until it undergoes a process or change by which the ova and such extraneous matters separate from one another, the former rising to the surface of the pickle, while the latter falls to the bottom of it.

2. The combination of the male-sturgeon oil, as above mentioned, with the salted ova, for the purpose of improving the manufacture thereof, as specified.

In testimony whereof I have hereto set my signature this 12th day of November, A. D. 1850.

R. G. WESTACOTT.

Witnesses:
  F. MUNN,
  J. HENRY HILL.